Nov. 2, 1965  R. V. MATHISON  3,214,816
FASTENERS AND ARTICLES CONTAINING SAME
Filed Feb. 11, 1963
FIG. 1
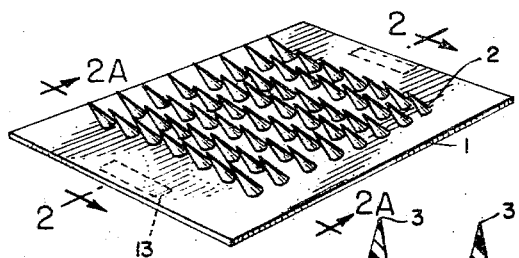
FIG. 2
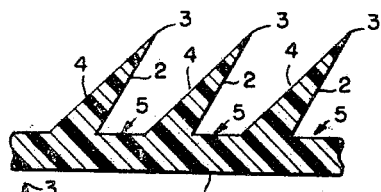
FIG. 2A
FIG. 3
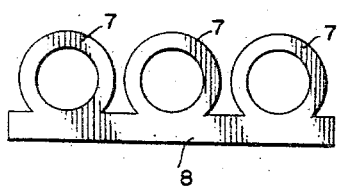
FIG. 4
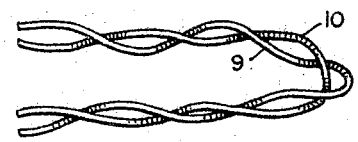
FIG. 5
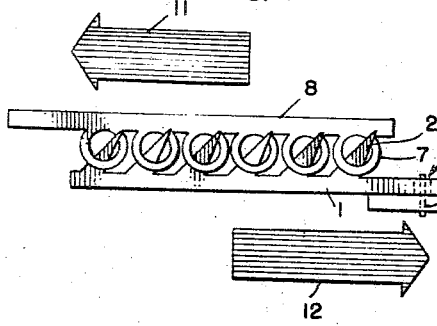
FIG. 6
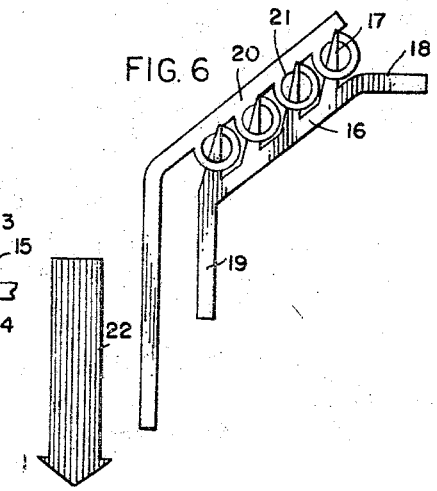
INVENTOR:
ROBERT V. MATHISON
BY Marshall, Johnston,
Cook & Root
ATT'YS

United States Patent Office 3,214,816
Patented Nov. 2, 1965

3,214,816
FASTENERS AND ARTICLES CONTAINING SAME
Robert V. Mathison, 5 Woodcrest Road, Asheville, N.C.
Filed Feb. 11, 1963, Ser. No. 257,491
5 Claims. (Cl. 24—204)

This invention relates to fasteners and to articles containing fasteners.

Various types of fasteners are known. Thus, it is common practice to join two materials together by the use of slide fasteners. More recently fasteners have been developed which consists of hook-shaped sections formed from a filament of synthetic resin. These filaments are woven into a material to form loops which are then cut to form the hook-shaped sections. When two layers of material, both containing these hook-shaped sections, are engaged with one another, the hooks in the respective sections hold them together.

One of the objects of the present invention is to provide a fastener which is simpler and less expensive to manufacture than the conventional slide fastener or the hook-type fastener previously mentioned.

Another object of the invention is to provide a fastener which is readily engageable with a surface containing loops or perforated openings and which can also readily be disengaged from said surface.

A further object of the invention is to provide a new and improved type of fastener which can be made from a synthetic resin or polymer.

Another object of the invention is to provide a new and improved type of fastener which can be made by a molding operation.

Still another object of the invention is to provide new and improved articles wherein one or more layers are held together by a new and improved fastening means.

Other objects and advantages of the invention will appear from the following description in conjunction with the accompanying drawings in which FIGURE 1 is a perspective view of one form of fastener embodying the invention;

FIGURE 2 is an enlarged partial cross section taken along the line 2—2 of FIGURE 1;

FIGURE 2A is an enlarged partial cross section taken along the line 2A—2A of FIGURE 1;

FIGURE 3 illustrates the surface of a looped fabric which is adapted to be engaged with a fastener of the type shown in FIGURE 1;

FIGURE 4 illustrates an open weave fabric which is adapted to be engaged with a fastener of the type shown in FIGURE 1;

FIGURE 5 illustrates an article containing a first layer of material having loops in the surface thereof in assembled relationship with a second layer of material comprising a fastening device of the type shown in FIGURE 1; and FIGURE 6 illustrates a modification of the invention in which elements of the fastening device are mounted vertically on a slant surface.

In accordance with the invention a fastener is provided comprising a supporting structure of a synthetic polymer having a plurality of smooth sided, substantially rigid, closely spaced projections integrally formed of said polymer on at least one side of said supporting structure and tapering from their bases to relatively sharp tips. The said projections preferably extend outwardly from said supporting structure at an angle of 30 to 80°. These projections are preferably closely spaced in parallel rows in which they all extend in the same direction and the rows are close enough together so that the tips of projections in one row extend above the sides, or partially overlap the projections in an adjacent row. In other words, if a vertical line were drawn from the tip of one projection it would intersect the side of an adjacent projection. The projections are preferably conical or pyramidal and are spaced from one another at their bases a distance of 0.03 to 0.10 inch. They also preferably have a center-to-center spacing at their tips from 0.03 to 0.25 inch. The size of the bases of the projections is preferably at least 0.03 inch in one dimension. The vertical height of the tips of the projections from the supporting structure is preferably within the range of 0.03 to 0.150 inch. The number of projections is preferably with the range of 200 to 500 per square inch.

As a typical example, the projections can be 0.050 inch in length and slanted at an angle of 45° with the supporting structure. The bases of these projections can be 0.030 inch in diameter and taper to a tip having a diameter of 0.010 inch. The supporting structure can be 0.014 inch in thickness at places where there are no projections and the overall thickness from the tips of the projections through the supporting structure can be 0.064 inch. There can be a projection tip every 0.050 inch or about 400 points per square inch.

As another example, the thickness of the supporting structure can be 1/32 inch. The projections can be slanted at an angle of 55°. The projections are disposed in rows in two directions, the rows being 1/16 inch apart and the projections being 1/16 inch apart center-to-center in each row. The vertical height from the tips of the projections to the top of the supporting structure can be 1/16 inch. Considering each projection as a cone, the base can be 1/32 inch. The projections can overlap each other to the extent that a vertical line drawn from the tip of one projection will substantially intersect the mid point of the base of the preceding projection. Thus, a fastener of this type containing eight projections in each row longitudinally and seven rows laterally will occupy a space of approximately ½ inch on each side allowing some room for margins.

The size and arrangement of the projections will vary to some extent depending upon the intended use but in most cases it is preferable that the projections be integrally formed or molded on a supporting sheet at an angle of 45 to 60°, that the adjacent projection be separated from each other center-to-center by a distance of from 0.060 to 0.150 inch, and that the vertical height from the tips of the projections to the surface of the supporting sheet be from 0.060 to 0.150 inch.

The synthetic polymer from which the fastener is formed can be a homo-polymer, such as a polymer of formaldehyde (e.g., Delrin), or a polymer of tetrafluoroethylene (e.g., Teflon), or polyethylene or polypropylene, or a copolymer (e.g., nylon). These polymers can also be described as synthetic resins. Fasteners of the type described can be secured to a given material and will cause such material to adhere to a second material (for example a textile fabric, an open cell polyurethane foam, or the like) having surface openings therein when the two materials are brought together in such a way that the second material is under tension in a direction opposed to the direction of the projections of the fastening device. The fasteners are especially useful in joining together fabrics having a looped surface, such as, for example, pile fabrics. The projections of the fastener are adapted to pass through the openings in the loops of the textile filaments or threads so that the latter are held in engagement or contact with another material to which the fastener is secured. This makes it possible to employ the fastener for securing together upholstery in the upholstering of furniture or for securing portions of slipcovers which are applied to furniture. Thus, the resultant article comprises a first layer of material having surface openings therein in assembled relationship with a second layer of material comprising a supporting structure having a plurality of individual, closely spaced, smooth, substantially rigid projections extending outwardly in acute angular relationship to said supporting structure and passing through said surface openings in said first layer.

Referring to the drawings, the fastener shown in FIGURE 1 consists of a relatively thin flexible supporting base 1 on which are formed by molding a plurality of conical projections 2 which are slanted at an angle of approximately 55°. In the cross sectional view shown in FIGURE 2 it will be seen that the tips 3 of the projections 2 slightly overlie the sides 4 of each preceding projection. The bases of the projections are spaced from each other at 5 and the rows of projections are spaced from each other at 6 as shown in FIGURE 2A.

FIGURE 3 is a diagrammatic showing of the loops 7 aa the surface of a textile fabric 8. These loops can be formed of synthetic filaments or any conventional materials normally used in making such fabrics.

FIGURE 4 illustrates an open weave fabric in which the threads or filaments 9 and 10 are loosely woven so as to provide openings between them.

FIGURE 5 illustrates the manner in which the looped fabric of FIGURE 3 is assembled with the fastener of FIGURE 1 so that the projections 2 pass through the loops 7. The arrows 11 and 12 indicate the direction of the applied force required to maintain the two components in assembled relationship. It will be understood that the fastener is attached to another layer of material in any suitable manner, for example, by providing a knock-out opening 13 which can be removed to form a hole or opening whereby the fastener can be sewn, stapled or otherwise secured to a second layer of material. In FIGURE 5 the second layer of material 14 is secured by a staple 15 passing through the opening 13.

FIGURE 6 illustrates a modification of the invention in which the supporting structure 16 is disposed at an angle and the projections 17 are substantially vertical but form an acute angle with the upper surface of the supporting structure 16. The end portions 18 and/or 19 can be fastened to a bracket or other suitable supporting surface and a pile fabric 20 can be supported in a vertical position with the loops 21 in the surface of the pile fabric engaging the projection 17. In this manner the fastening device can be employed, for example, to hang curtains or other objects. The arrow 22 shows the direction of the applied force which holds the loops 21 of the material 20 in contact with the projections 17. Where the fastener is used in a bracket for hanging purposes as in FIGURE 6, the angularity of the projections with the upper surface of the supporting structure is normally somewhat greater than that employed in other uses.

It will be recognized that the invention is subject to variation and that a number of modifications can be made without departing from the spirit of the invention. It is not absolutely essential that the projections all run in the same direction. This is usually desirable, however, because it facilitates detaching the fastening device without destroying the surface of the material to which it is fastened. In fact, one of the advantages of the present invention in the form herein described is the ease with which the fastener can be applied to a looped fabric or an open weave material or another porous material and withdrawn therefrom without damage.

As an example of further variations and modifications of the invention, the angle and/or the length of the projections can be varied from one end of the fastener to the other. For instance, the projections can have a length of 0.10 inch and a 45° angle in the front of the fastener and gradually change to a length of 0.125 inch and an angle of 55° at the back of the fastener. This provides a more uniform engagement when the fastener is pulled in contact with a porous material in a flat plane.

In the foregoing description it will be understood that while the fastener has been described as a separate piece it can actually be molded or otherwise integrally formed as a part of the second layer of material.

The invention is hereby claimed as follows:

1. A fastener structure adapted to be removably fastened on a material with penetrable surface openings and comprising a molded synthetic polymer article embodying a molded base with a group of closely spaced, integrally molded, small projections emanating from a face thereof, said projections of said group being arranged in transverse, parallel rows, said projections being smooth-sided and tapering from the bases thereof to relatively pointed outer ends, the longitudinal axes of said projections of said group being straight lines extending at right angles to said rows and obliquely to said face at an acute angle not exceeding 60° with respect to said face, said projections of said group having an occurrence corresponding to 200–500 projections per square inch of said face covered by said group of projections and having a height from the respective tips to the base in the range of 0.030 inch to 0.150 inch, and thereby sloping relative to said face in the same general direction and forming a unit of sloping, closely spaced, penetrating members adapted to penetrate a plurality of closely-spaced surface openings of a material of the character aforedescribed, the shortest side of the respective projections of said group also defining from the respective base to the respective tip thereof a straight line sloping in the same general direction as said longitudinal axes and at an acute angle relative to said face, whereby a pulling force in a direction essentially parallel with said face and at right angles to said rows and opposite to said general direction on the portion of material of the aforesaid character penetrated by said projections causes said portion of said material to be firmly and deeply seated on said projections and thereby firmly gripped on said fastener structure under said pulling force, said gripped portion of said material being quickly releasable from said projections upon release of said pulling force.

2. A fastener structure adapted to be removably fastened on a material with penetrable surface openings and comprising a molded synthetic polymer article embodying a molded base with a group of closely spaced, integrally molded, small projections emanating from a face thereof, said projections of said group being arranged in parallel rows extending both transversely and longitudinally, said projections being smooth-sided and tapering from the bases thereof to relatively pointed outer ends, the longitudinal axes of said projections of said group being straight lines extending at right angles to said transverse rows and obliquely to said face at an acute angle not exceeding 60° with respect to said face, said transverse rows of said projections being spaced sufficiently close so that the tips of said projections in one row overlie the bases of the projections in the next adjacent row, said projections of said group having a height from the respective tips to the base in the range of 0.030 inch to 0.150 inch and sloping relative to said face in the same general direction and forming a unit of sloping, closely spaced, penetrating members adapted to penetrate a plurality of closely spaced surface openings of a material of the character aforedescribed, the shortest side of the respective projections of said group also defining from the respective base to the respective tip thereof a straight line sloping in the same general direction as said lonigtudinal axes and at an acute angle relative to said face, whereby a pulling force in a direction essentially parallel with said face and at right angles to said transverse rows and opposite to said general direction on the portion of material of the aforesaid character penetrated by said projections causes said portion of said material to be firmly and deeply seated on said projections and thereby firmly gripped on said fastener structure under said pulling force, said gripped portion of said material being quickly releasable from said projections upon release of said pulling force.

3. A fastener member as claimed in claim 2 wherein said projections of said group have an occurrence corresponding to 200–500 projections per square inch of said face covered by said group of projections.

4. A fastener member as claimed in claim 2 wherein said projections are smooth-sided, oblique cones.

5. A combination of a material with closely-spaced, penetrable surface openings and a fastener member removably secured thereon, said fastener member comprising a molded synthetic polymer article embodying a molded base with a group of closely-spaced, integrally molded, small projections emanating from a face thereof, said projections of said group being arranged in transverse, parallel rows, said projections being smooth-sided and tapering from the bases thereof to relatively pointed outer ends, the longitudinal axes of said projections of said group being straight lines extending at right angles to said rows and obliquely to said face at an acute angle not exceeding 60° with respect to said face, said projections of said group having an occurrence corresponding to 200–500 projections per square inch of said face covered by said group of projections and having a height from the respective tips to the base in the range of 0.030 inch to 0.150 inch, and thereby sloping relative to said face in the same general direction and forming a unit of sloping, closely spaced, penetrating members, the shortest side of the respective projections of said group also defining from the respective base to the respective tip thereof a straight line sloping in the same general direction as said longitudinal axes and at an acute angle relative to said face, said projections penetrating said surface openings of said material with said material being firmly and deeply seated by a pulling force in a direction essentially parallel with said face and at right angles to said rows and opposite to said general direction on the portion of material of the aforesaid character penetrated by said projections, said gripped portion of said material being releasable immediately from said fastener member upon release of said pulling force.

References Cited by the Examiner

UNITED STATES PATENTS

| 1,357,929 | 11/20 | Van Heusen. | |
|---|---|---|---|
| 1,638,073 | 8/27 | Van Heusen. | |
| 1,933,391 | 10/33 | Reeves. | |
| 2,041,262 | 5/36 | Ness. | |
| 2,645,804 | 6/53 | Gantz. | |
| 2,920,334 | 1/60 | Keller | 15—187 |
| 3,031,730 | 5/62 | Morin. | |
| 3,106,761 | 10/63 | Mohring | 45—24 |

FOREIGN PATENTS

| 540,376 | 3/56 | Italy. |
|---|---|---|
| 359,670 | 3/62 | Switzerland. |

WILLIAM FELDMAN, *Primary Examiner.*

DONLEY J. STOCKING, *Eaxminer.*